United States Patent [19]

Talbert

[11] 4,429,675
[45] Feb. 7, 1984

[54] FUEL SYSTEM FOR INTERNAL COMBUSTION ENGINES

[75] Inventor: William L. Talbert, York, Pa.

[73] Assignee: Onics, Inc., York, Pa.

[21] Appl. No.: 226,618

[22] Filed: Jan. 21, 1981

Related U.S. Application Data

[63] Continuation of Ser. No. 943,660, Sep. 18, 1978, abandoned.

[51] Int. Cl.³ ............................................. F02M 31/00
[52] U.S. Cl. ..................................... 123/558; 123/557
[58] Field of Search ............... 123/557, 558, 544, 525, 123/527; 261/144, 145

[56] References Cited

U.S. PATENT DOCUMENTS

| | | | |
|---|---|---|---|
| 860,522 | 7/1907 | Brown | 123/522 |
| 1,980,496 | 11/1934 | Musselwhite | 123/557 |
| 2,732,835 | 1/1956 | Hundt | 123/538 |
| 3,167,059 | 1/1965 | Love | 123/52 MF |
| 4,151,821 | 5/1979 | Wichman | 123/557 |
| 4,178,897 | 12/1979 | Strem | 123/557 |

FOREIGN PATENT DOCUMENTS

| | | | |
|---|---|---|---|
| 473369 | 2/1929 | Fed. Rep. of Germany | 123/52 MF |
| 840643 | 4/1939 | France | 123/557 |

Primary Examiner—Ronald H. Lazarus
Attorney, Agent, or Firm—Bacon & Thomas

[57] ABSTRACT

A system for modifying and utilizing hydrocarbon fuels in the operation of internal combustion engines wherein increased fuel efficiency and reduction in amount of polluting products of combustion produced are realized. Hydrocarbon fuels normally entirely consumed in the operation of internal combustion engines are modified by separating lighter, highly volatile fractions of a paraffinic and ultrafast burning nature from the fuels and utilizing substantially only the lighter fractions for fueling the internal combustion engine, with the heavier fractions being stored separately from the original hydrocarbon fuel source. The lighter fractions permit operating the engine with a lean fuel mixture having a higher than stoichiometric air-to-fuel ratio, thereby better accommodating the characteristic intermittent fuel demand of the operator, reducing the production of undesirable nitrogen oxides, permitting the engine to operate at reduced operating temperatures and prolonging the useful life of engine components.

34 Claims, 7 Drawing Figures

FUEL SYSTEM FOR INTERNAL COMBUSTION ENGINES

This is a continuation of application Ser. No. 943,660, filed Sept. 18, 1978, now abandoned.

BACKGROUND OF THE INVENTION

1. Field of the Invention

The invention generally relates to a system for providing improved fuel in a more efficient manner to an internal combustion engine. More specifically, the invention involves the field of technology relating to hydrocarbon fuel treatment or modification systems that are utilized in conjunction with internal combustion engines, particularly those associated with vehicles.

2. Description of the Prior Art

Internal combustion engines are generally fueled by hydrocarbon fuel sources, such as kerosene, gasoline and the like. In particular, the current use of gasoline by such engines does involve many engineering considerations if the problems attendant the use of this fuel are to be minimized. In addition to such considerations, there is also the realization that the world oil supply is substantially finite, thereby imposing increased financial and source material constraints as the demand for gasoline increases with the passing years.

Current internal combustion engines fueled by gasoline are generally inefficient and produce various emissions or products of combustion which have harmful effects on the general environment. Moreover, such engines operate at rather high temperatures which often cause breakdowns of lubricating oils, degradation of sparkplugs, valves and other engine components, and production of undesirable carbonaceous deposits on the engine working surfaces which reduce engine life and increase maintenance costs.

A given volume of gasoline is substantially comprised of two-thirds by volume of lighter fractions which as a gas are paraffinic in nature and one-third by volume heavier fractions which are oily in nature. During the operation of a vehicle engine, gasoline droplets mixed with air from the carburetor are introduced into the heated intake manifold and respective hot combustion chambers wherein there occurs a separation of lighter fractions from the heavier fractions and also some conversion of the hydrocarbons into various petrochemical products due to the liquid phase oxidation of the hydrocarbons. The combustion of the air and the lighter hydrocarbon fractions is inhibited by the presence of the heavier hydrocarbon fractions, trace petrochemicals and certain gasoline additives present. This situation encumbers ignition of lean fuel mixtures having higher than stoichiometric air-to-fuel ratios. Moreover, such mixtures are slow burning and require ignition before the engine reaches top dead center, particularly in short stroke engines, thereby reducing engine efficiency. The efficiency of an engine is further reduced by creating rich fuel mixtures having lower than stoichiometric air-to-fuel ratios by normal operational procedures, such as choking, idling and accelerating.

When gasoline undergoes combustion in an engine, a rich fuel mixture having a lower than stoichiometric air-to-fuel ratio generally yields carbon monoxide, unburned hydrocarbons and causes the engine to operate at a fairly high temperature. A stoichiometric fuel mixture having an ideal air-to-fuel ratio will generally yield nitrous oxides and produce an excessively hot engine. However, an engine that is operated with a lean fuel mixture having a higher than stoichiometric air-to-fuel ratio produces a minimum of harmful emissions or products of combustion. This latter situation permits the engine to operate at the coolest possible temperature in very high air-to-fuel ratios. In order to realize this desirable objective, it has been recognized that a lean fuel mixture cannot be utilized unless the fuel itself is more volatile than gasoline so that ignition can readily occur at high air-to-fuel ratios. With such a volatile fuel, substantially complete combustion is achieved, with a minimum production of undesirable products of combustion. Correspondingly lower engine operating temperatures are realized, as well as increased fuel efficiency. The lighter hydrocarbon fractions in gasoline are characteristic of such volatile fuels.

The prior art has recognized that the lighter fractions of hydrocarbon fuels, particularly gasoline, do provide enhanced operating characteristics when utilized for the initial starting of internal combustion engines, particularly in cold weather. This is due to the high volatility of the lighter fractions which, during engine start-up, permit faster engine starting due to more rapid vaporization of such volatile fuel in the induction system of the engine. It has also been recognized that such fuels serve to reduce cold start exhaust emissions when compared to the use of regular fuel, such as gasoline. The prior art practice has been limited to the use of the lighter fractions of gasoline, generally referred to as dry gas, as a specialized fuel limited only for engine starting. It has been maintained that the continued use of such a high volatility fuel in the engine after engine warm-up is not practical due to economic considerations, with the use of regular gasoline in a conventional fuel system being preferred for continued engine operation. Accordingly, it has heretofore been necessary to incorporate dual fuel systems wherein the high volatile fractions are utilized only for engine start-up and a conventional fuel is used for the continued operation of the engine. It has further been proposed to utilize only one source of starting fuel in conjunction with the operation of an engine wherein the fuel source is treated to extract lighter fractions therefrom for providing engine starting fuel.

SUMMARY OF THE INVENTION

It is an object of this invention to provide an improved system for utilizing hydrocarbon fuels in the operation of internal combustion engines.

It is another object of the invention to provide a system for maximizing the efficiency of fuel consumption by an internal combustion engine and minimizing the production of polluting products of combustion.

It is yet another object of the invention to provide a fuel system that is particularly advantageous for use in vehicles driven by internal combustion engines wherein only one grade of fuel is needed for running a variety of different engine types.

It is a still further object of the invention to provide an improved fuel system which serves to protect internal combustion engines from fuel contamination, prolong useful engine life and reduce engine maintenance costs.

These and other objects of the present invention are achieved by providing a fuel system which modifies a hydrocarbon fuel, such as gasoline, that is normally entirely consumed by an internal combustion engine and utilizing only a specified portion of the fuel for carburetion into the engine, while storing and isolating the unused portion from the original fuel source. This is accomplished by providing a fuel which is capable of being separated into two specific fractions, a lighter or vapor fraction comprising primarily higher volatile hydrocarbons and a heavier liquid fraction comprising primarily oily type hydrocarbons. This fractionation is achieved in a separator device which utilizes either ultrasonic energy or heat. The lighter vapor fraction is carbureted directly into the engine, while the heavier liquid fraction is stored in isolation from the original unseparated fuel source. Control circuits are provided for assuring that the proper air-to-fuel ratio is maintained for the operation of the engine in accordance with engine demand, such as imposed thereon by a driver of a vehicle through accelerator actuation, throttle or speed control setting. Initial starting of the engine may be achieved through either the direct injection of fuel vapor or the fogging of unfractionated fuel into the carburetor. A safety valve is provided for assuring vehicle safety against potential hazards imposed by the utilization of fuel vapor for the continuous or regular operation of the engine according to the invention.

Further objects, features and attributes of the present invention will become apparent from the following description and appended claims, reference being to the accompanying drawings forming a part of the specification wherein like reference characters designate corresponding parts of the several views.

DETAILED DESCRIPTION OF THE PREFERRED EMBODIMENTS

Figures 1, 2:
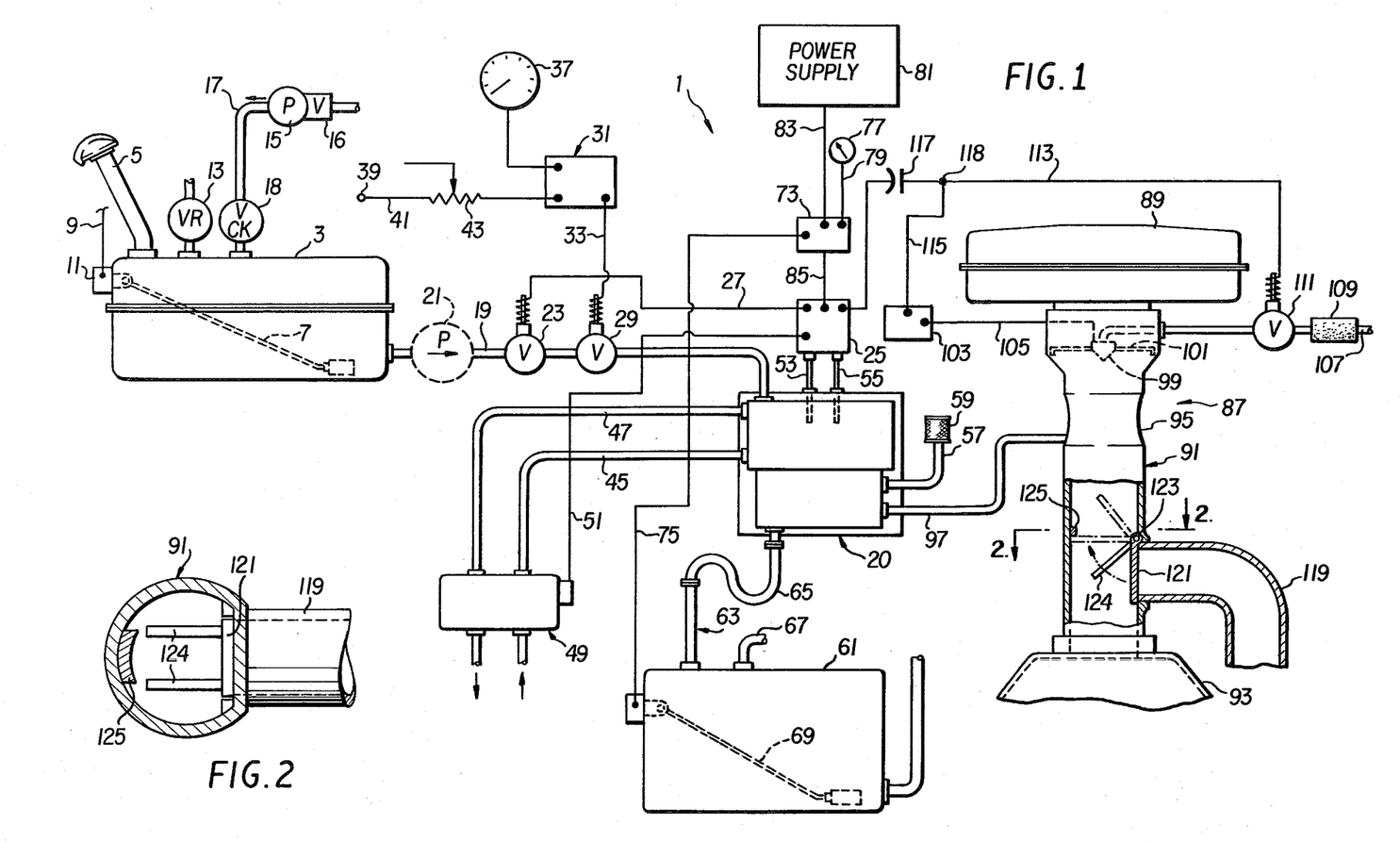
FIG. 1 is a schematic view of the present invention as utilized in conjunction with the internal combustion engine of a vehicle.
FIG. 2 is a view taken along the line 2—2 of FIG. 1.

A fuel system 1 according to the invention is schematically depicted in FIG. 1. A first container 3 for storing a source of hydrocarbon fuel includes a spout 5 through which fuel may be added to container 3. A float indicator 7 may be disposed within container 3 for indicating fuel level therein and providing this information to a gauge (not shown) through a line 9 that transmits a signal generated by an indicator source 11, the latter being well known in the art and generally utilized in conjunction with fuel tanks of motor vehicles. In this regard, container 3 may form the fuel tank of a motor vehicle, with spout 5 being the intake conduit through which appropriate fuel derived from a service station may be added. Container 3 further includes a relief valve 13 to provide venting capability for the interior of container 3. A pump 15 having an associated valve 16 disposed upstream thereof may be provided to inject air through a conduit 17 into container 3 for the purpose of pressurizing the fuel contained therein above atmospheric pressure to prevent vaporization of any volatile hydrocarbon fuel fractions. A check valve 18 may be disposed in conduit 17 to control pressurization.

Fuel from container 3 is directed through a conduit 19 to a separator 20. A pump 21 may be disposed in conduit 19 for directing fuel therethrough as an alternative to providing pump 15 for pressurizing the interior of container 3. A first solenoid valve 23 is disposed in conduit 19 downstream from pump 21 and is actuated by a thermostatic control unit 25 through a line 27. A second solenoid valve 29 is disposed downstream of valve 23 for actuation by an electronic fuel metering unit 31 through a line 33. Unit 31 receives signal indication of the speed of the internal combustion engine (not shown), with which engine system 1 is associated, through a line 35 that is connected to a tachometer 37. Load or operator demand on the engine and imposed at point 39 is transmitted as a signal to unit 31 through a line 41 having a potentiometer 43, or other such similar device, diposed therein.

Separator 20 is operated off of the heat supplied by exhaust manifold gases created during the operation of the engine. These gases are supplied to separator 20 through an intake conduit 45 and an output conduit 47. The regulator of exhaust gas supply to separator 20 is effected by a control valve 49 that is electrically actuated by control unit 25 through a line 51. A pair of thermal sensors 53 and 55 are disposed within separator 20, thereby permitting control unit 25 to monitor temperature conditions in separator 20. An air vent 57 having an associated filter 59 provides separator 20 with atmospheric air to enhance fluid flow conditions therein. The heavy liquid fuel fractions derived by separator 20 are drained into a second container 61 through a drain conduit 63, preferably including a curved trap section 65 disposed therein. Container 61 is also provided with a conduit 67 for venting the interior of container 61 to the atmosphere. As in the case of first container 3, second container 61 also includes a float indicator 69 for the purpose of ascertaining fluid level therein, with the signal provided thereby being sensed by indicator unit 71 and transmitted to a switching unit 73 through a line 75. A gauge 77 may be connected to unit 73 through a line 79 for the purpose of providing a visual indication of the fluid level in container 61.

A main power supply 81, such as a battery or other similar source of current, is directly connected to switching unit 73 through a line 83, with unit 73 being directly connected to unit 25 through a line 85.

A carburetor 87 is shown to include an air intake filter 89 and a throat 91 disposed in fluid communication with an intake manifold 93 of the internal combustion engine. Throat 91 includes a venturi portion 95 within which vaporized fuel is received from separator 20 through an intake conduit 97. Throat 91 further includes a fogging nozzle 99 supported by a bracket 101 for the purpose of producing and injecting a spray of very fine fuel droplets through throat 91 and into intake manifold 93 during starting of the engine. Nozzle 99 may be provided with an internal ultrasonic vaporization unit (not shown) for assisting in producing an ultra-fine fuel fog. Power for operating the ultrasonic unit is derived from a secondary power supply 103, with such power being transmitted through a line 105. Fuel supply for nozzle 99 is provided through a conduit 107 that receives fuel from first container 3. A fuel filter 109 may be disposed in conduit 107. A solenoid valve 111 is also disposed in conduit 107 between filter 109 and nozzle 99 for controlling fuel flow therethrough. Actuation of valve 111 is effected by control unit 25 through a line 113. Power supply 103 is in electrical connection with line 113 through a line 115. A capacitor 117 is disposed between control unit 25 and the connection between lines 113 and 115, as generally indicated at 118.

Referring now to FIG. 2 in conjunction with that portion of FIG. 1 from which it is derived, it is seen that throat 91 of carburetor 87 is provided with a misfire vent 119 extending laterally away therefrom for directing misfire products of combustion into the atmosphere. A closure plate 121 is pivotally carried by throat 91, as indicated at 123, for the purpose of sealing off vent 119 from the interior of throat 91. Plate 121 includes a pair of impact members 124 disposed at an angle from the upper edge of plate 121 and extending across the longitudinal path of throat 91 when plate 121 is in its position of sealing off vent 119. Members 123 are rigidly associated with plate 121 and pivot in conjunction therewith. An abutment 125 is provided on the interior wall of throat 91 to limit the upward pivoting movement of plate 121 to a position at which the plane of plate 121 is perpendicular to the longitudinal axis of throat 91, as seen in FIG. 1. Referring to FIG. 2, members 124 terminate short of abutment 125 and hence do not make contact with same during the pivoting of plate 121. It is of course desirable that the planar configuration of plate 121 not only serves to completely seal off vent 119, but also conform substantially to the cross-sectional configuration of throat 91 to thereby seal off the passageway defined thereby when plate 121 is pivoted against abutment 125.

When plate 121 seals off vent 119 and a misfire occurs, the back pressure created by the products of combustion are sent up through throat 91, thereby contacting impact members 124. This causes members 124 to pivot upwardly, with such movement imparting corresponding movement to plate 121 and causing the latter to contact abutment 125 and seal off further fluid passage up through throat 91. When plate 121 seals off vent 119, members 124 are contacted by the carbureted mixture of fuel and air and serve to further agitate and homogenize same prior to its injection into intake manifold 93.

Figure 3:
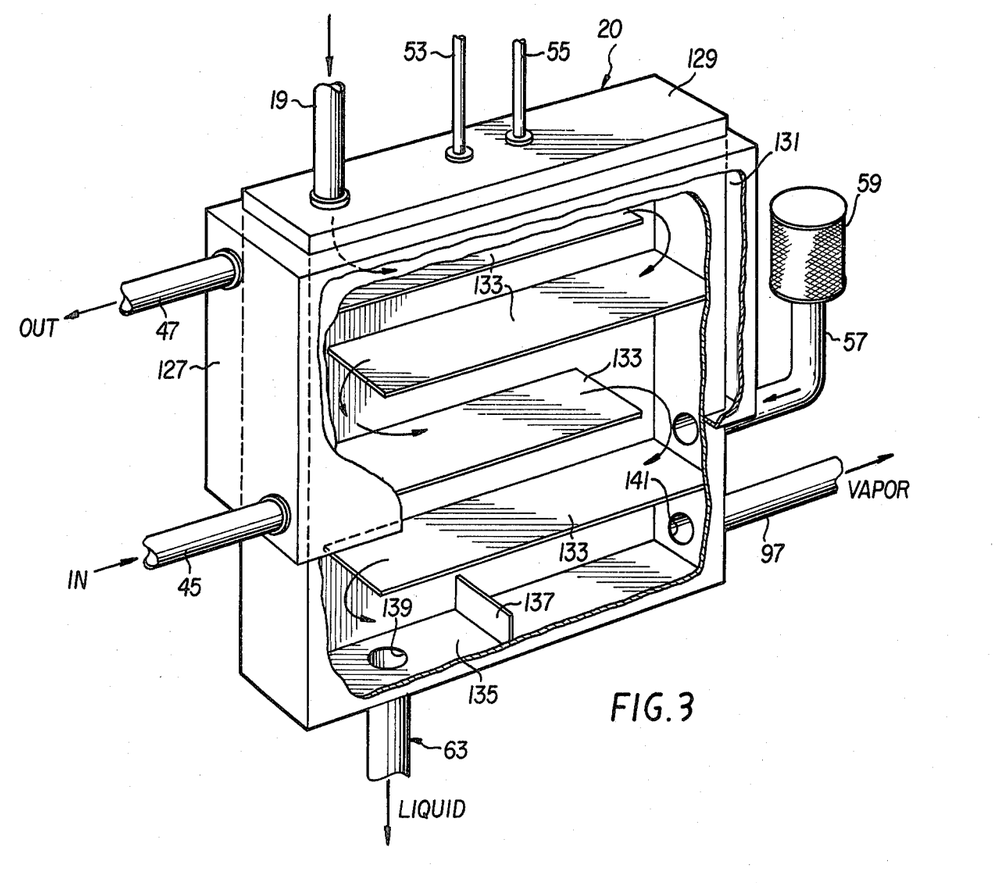
FIG. 3 is a fragmentary perspective view of one embodiment of the fuel separator device utilized in the invention for separating the fuel into light vapor fractions and heavy liquid fractions.

The structural details of separator 20 shall now be described with reference to FIG. 3. Separator 20 includes a hollow jacket 127 that surrounds an inner casing 129 to define an annular chamber 131 therebetween. Hot fluids from the exhaust manifold of the engine are directed into chamber 131 through intake conduit 45 and exit chamber 131 through output conduit 47 for return to the engine exhaust system. Chamber 131 is separate and isolated from the interior of casing 129. Fuel entering casing 129 through conduit 19 is caused to travel through a labyrinth formed from a plurality of spaced shelves 133 secured to the internal walls of casing 129. During its travel, the fuel is heated by exhaust fluids passing through chamber 131, thus causing the lighter or paraffinic fractions of the fuel to vaporize and separate from the heavier or oily liquid fractions. A small amount of filtered air received through vent 57 enhances flow of the fuel over shelves 133 after its fractionation. When the fractionated fuel has reached the end of casing 129, as defined by a wall 135, the heavier liquid fractions impinge against a weir 137 supported on wall 135 and is directed thereby through a drain opening 139 provided in wall 135 and through conduit 63 for ultimate storage in second container 61. The lighter vapor fractions rise and travel over weir 137 and pass through exit opening 141 formed in casing 129 and through conduit 97 for injection into venturi 95 of carburetor 87. Dual heat sensors 53 and 55 provide a constant monitoring of the temperature within casing 129 and relay their signals to control unit 25. It is preferable that at least a pair of sensors 53 and 55 are utilized as a precautionary measure against the failure of a single sensor.

Figure 4:
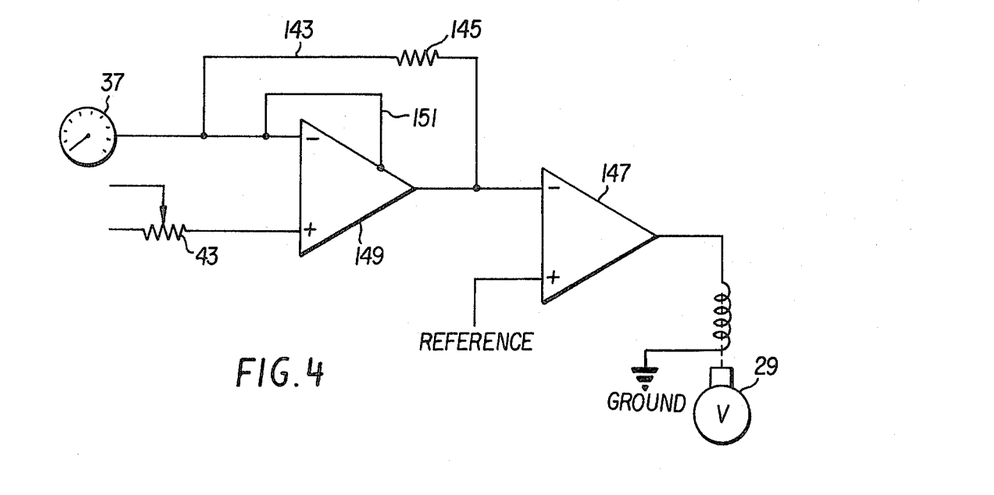
FIG. 4 is a schematic view of one embodiment of the fuel metering device utilized in the system of the invention.

A schematic representation of the basic components included in electronic fuel metering unit 31 is shown in FIG. 4. As earlier indicated, engine speed is monitored by tachometer 37 and engine demand, such as imposed by an operator of a motor vehicle, is intermittently and variably expressed through potentiometer 43. Because of the high volatility of the vapor fuel derived from separator 20, the engine is efficiently operated at any given steady state on a lean or higher than stoichiometric air-to-fuel ratio. This is maintained through a lean circuit 143 provided with a resistor 145 disposed therein. During steady state operation, the signal path is only through circuit 143 to a summing amplifier 147 which in turn activates solenoid valve 29, the latter being variable in operation and provides the desired degree of fuel metering through conduit 19 in accordance with variations in both engine speed and operator demand. In the event of an increase in operator demand as expressed through potentiometer 43, a difference in the signals imposed by engine speed and engine demand immediately occurs, which difference is reflected in current supplied by potentiometer 43 to an output transconductance amplifier 149. This difference is amplified through an enrichment fuel circuit 151, with the outputs from the lean circuit and enrichment fuel circuit being passed to and added together by amplifier 47. The resultant signal then causes valve 29 to meter fuel flow through conduit 19 in direct proportion to the fuel requirement. The additional fuel requirement imposed by operator demand and reflected through enrichment fuel circuit 151 always maintains a higher than stoichiometric air-to-fuel ratio, although during intermittent moments of increased operator demand, the ratio does approach closer to stoichiometric conditions than when the engine is operating under any given steady state condition.

Figures 5, 6, 7:
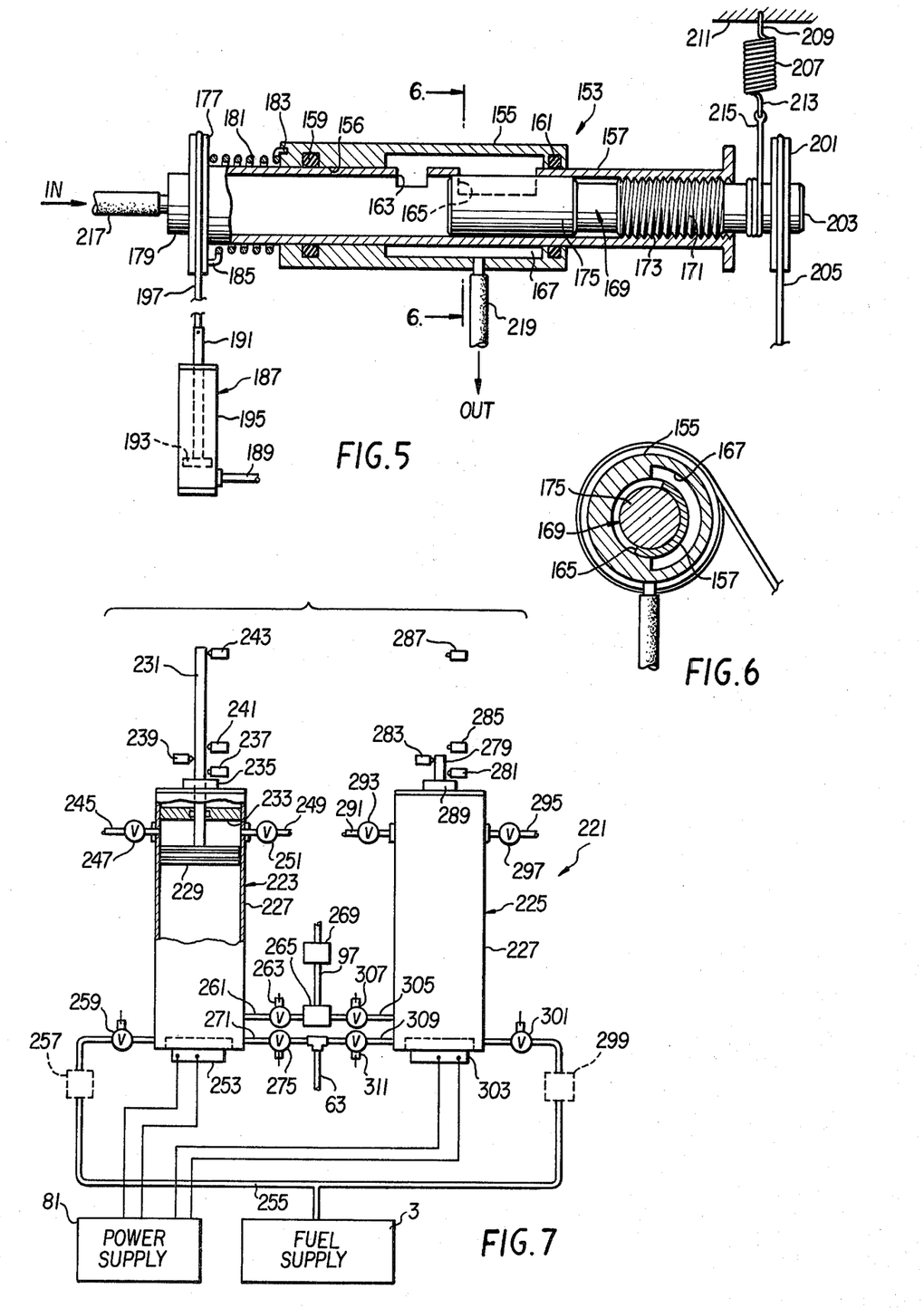
FIG. 5 is a partial sectional view of a second embodiment of the fuel metering device utilized in the system of the invention.
FIG. 6 is a view taken along the line 6—6 of FIG. 5.
FIG. 7 is a schematic view of a second embodiment of the fuel separator device utilized in the system of the invention.

An alternative embodiment of a fuel metering unit which can be utilized in system 1 of the present invention is shown in FIG. 5. In this embodiment, metering unit 153 may be substituted for previously described electronic metering unit 31 and, moreover, comprises a mechanical analog thereof. Unit 153 includes a fixed casing 155 provided with a bore 156 within which a tubular valve member 157 is rotatably journaled. Valve member 157 is of a cylindrical configuration and is sealed within casing 155 by a pair of gaskets 159 and 161, in the form of O-rings or the like. Valve member 157 is provided with a first slot 163 which extends approximately 180° around the wall thereof. Spaced from slot 163 is a second slot 165 having a greater width than slot 163 and also extending approximately 180° around the wall of valve member 157. As more clearly indicated in FIG. 6, casing 155 is provided with a substantially semicylindrical cavity 167 which communicates with the interior of valve member 157 through slots 163 and 165, the degree of communication being dependent upon the rotational position of valve member 157 with respect to bore 156.

A plug 169 is secured within valve member 157 through a male threaded portion 171 which engages a corresponding female threaded portion 173 provided in the interior wall of valve member 157. Plug 169 includes an enlarged closure head 175 having a diameter corresponding substantially to the internal diameter of valve member 157 and a length that exceeds the width of second slot 165. Thus, by screwing or unscrewing plug 169 within valve 157, closure head 175 permits varying the degree of communication between the interior of valve members 157 and cavity 167 through second slot 165. This variation in degree of communication is in addition to that afforded by the rotational positioning of valve member 157 within bore 156. It is of course recognized that the direction of corresponding threads 171 and 173 determines whether plug 169 is advanced into or retracted from valve member 157 during the rotation of plug 169 in a given direction, be it clockwise or counterclockwise.

Rotation of valve member 157 in correlation to engine speed may be achieved through a first pulley wheel 177 mounted on an axle 179 carried by the end of valve member 157 corresponding to first slot 163. A coil spring 181 having a first end 183 secured within casing 155 and a second end 185 secured in pulley 177 provides a counter rotative force to pulley 177 so that the latter is always restored to its original position after it has been rotated. Rotation of pulley wheel 177 is accomplished through a fluid cylinder assembly 187 which receives vacuum pressure through line 189 from the intake manifold 93 of the engine or other such source of pressure providing a corresponding indication of engine speed. A piston rod 191 having an associated piston 193 is disposed for reciprocating movement within a cylinder 195. The free end of rod 191 is connected to a flexible belt 197 or the like, which belt 197 is in turn secured around pulley wheel 177. As is apparent, actuation of fluid motor 187 causes a corresponding rotative displacement of valve member 157 with respect to casing 155. Subsequent deactivation of motor 187 causes spring 181 to restore valve member 157 to its original position with respect to casing 155.

Rotation of plug 169 is accomplished through a second pulley wheel 201 mounted on a free end 203 of plug 169. Rotation of pulley wheel 201 is effected by a flexible belt 205 that engages wheel 201 and is actuated in accordance with operator demand on the engine. In those circumstances where the engine is utilized in a vehicle, belt 205 may be mechanically linked to either the throttle or accelerator linkage. A coil spring 207 is provided with a first end 209 secured to a stationary support 211. A second end 213 is secured to one end of a flexible cable 215 which is wrapped around free end 203 of plug 169 and has its other end (not shown) secured thereto. The force of spring 207 imparted to plug 169 through cable 215 serves to restore the original position of plug 169 after rotative displacement thereof by forces imposed on pulley 201 through flexible belt 205.

Fuel is fed to the interior of valve member 157 through a supply conduit 217 and axle 179. As shall later be described, conduit 217 may be either conduit 19 or conduit 97, depending upon the separator device being utilized. Thus, depending upon the relative positions of valve member 157 with respect to casing 155 and closure head 175 with respect to second slot 165, the amount of fuel passing from the interior of valve member 157 into cavity 167 is precisely metered in accordance with both engine speed and operator demand. Fuel metered by unit 153 is conducted away from cavity 167 through a conduit 219, the latter being either conduit 19 or conduit 97 as shall also be later described.

Referring now to FIG. 7, there is shown a separator 221 which comprises an alternative device for incorporation in fuel system 1 in substitution for previously described separator 20. Separator 221 includes a pair of fluid motors 223 and 225 which operate in tandem with each other for the purpose of producing a continuous source of light vapor fraction for carburetion into intake manifold 93 of the engine.

Motor 223 comprises a cylinder 227 within which a piston 229 is disposed for reciprocating movement in association with a piston rod 231. A seal 233 is provided at one end of cylinder 227 to prevent escape of fluids therefrom. An external seal 235 is provided for sealing and journaling the reciprocating movement of rod 231. The extension and the retraction of rod 231 with respect to cylinder 227 serves to sequentially activate a plurality of spaced limit switches 237, 239, 241 and 243. Switches 237 and 239 are maintained in normally closed positions when not contacted by rod 231. Switches 241 and 243 are maintained in normally open positions when no contacted by rod 231.

The upper end of cylinder 227 is provided with a positive pressure line 245 for introducing pressurized fluid, such as air pressure from pump 15 or a similar source, into cylinder 227. A solenoid valve 247 is disposed in line 245 for controlling fluid flow therethrough into cylinder 227. A negative pressure line 249 is provided for supplying vacuum pressure, such as from intake manifold 93 or a similar source, into cylinder 227. A solenoid valve 251 controls pressure supplied through line 249.

At the lower portion of cylinder 227 is disposed a transducer 253 for generating ultrasonic energy within cylinder 227. Transducer 253 is operated off of main power supply 103. First container 3 supplies fuel to the interior of cylinder 227 through a supply conduit 255. A heater 257, which may be of the resistance type or heat exchange variety receiving hot fluids from the engine exhaust manifold, may be disposed in conduit 255 for preheating fuel prior to its introduction into cylinder 227. A solenoid valve 259 controls the flow of fuel into cylinder 227 through conduit 255. Lighter vapor fractions generated by motor 233 are passed out of cylinder 227 through a light fraction conduit 261, through a solenoid valve 263 disposed therein, through a switching valve 265 and finally through conduit 97 to previously indicated carburetor 87. A fuel metering device 269 disposed in conduit 97 controls the amount of light vapor fractions being carbureted into the engine in direct response to operator demand and engine speed. Metering device 269 may be either electronic fuel metering unit 31 or mechanical fuel metering unit 153. Switching valve 265 is preferably a spool valve having a reciprocating valve member permitting alternate fluid flow through conduit 97 from two sources. The heavy liquid fractions produced by motor 223 are passed out a conduit 271 into drain 63 for storage in previously indicated second container 61. A solenoid valve 275 is disposed in conduit 271 for controlling the flow of heavier fractions therethrough.

As shown in FIG. 7, motor 225 is in fluid communication with motor 223 and includes the same components as the latter. A piston (not shown) is also disposed in a cylinder 277 of motor 225 and includes an associated piston rod 279. Motor 221 also includes a plurality of limit switches 281, 283, 285 and 287 which function in the exact same manner as previously described switches 237-243 associated with motor 223. Rod 279 also includes a journal seal 289. Similarly, motor 225 is provided with a positive pressure line 291 with a solenoid valve 293 disposed therein, and a negative pressure line 295 having a corresponding solenoid valve 297 disposed therein.

Fuel is also supplied to cylinder 225 from container 3 through common conduit 255. As in the case of motor 223, conduit 255 feeding fuel motor 225 may also include a heater 299 and solenoid valve 301 for the same corresponding purposes. A transducer 303 is disposed at the lower portion of cylinder 227 for generating ultrasonic energy therein, with transducer 303 also being operated off of power supply 81. Light vapor fractions produced by motor 225 are sent to regulator valve 265 through a conduit 305 having a solenoid valve 307 disposed therein. Heavier liquid fractions produced by motor 225 are sent to drain 63 through a conduit 309 having a solenoid valve 311 disposed therein.

The operation of separator 221 shall be described with reference to motor 223 only since it is understood that the structural and functional features of motors 223 and 225 are exactly the same with the exception that they operate in opposite and tandem relationship to each other in order to produce a continuous flow of lighter fraction hydrocarbons through conduit 97 to carburetor 87.

When rod 231 is in its fully retracted position within cylinder 227 and makes no contact with switches 237-243, the interior of cylinder 227 is substantially devoid of any fuel or separated fractions thereof. In this position of rod 231, valve 247 closes off positive pressure line 245 and valve 251 is open to permit application of negative pressure through line 249 to the interior of cylinder 227. Valve 259 is open to permit fuel from container 3 to flow into cylinder 227 throughout conduit 255. Further, valves 263 and 275 are closed to prevent fluid flow through their respective conduits 261 and 271. Vacuum applied through line 249 from intake manifold 93 by the operation of the engine serves to raise piston 229 and associated rod 231, thereby initiating the upstroke movement of motor 223. When rod 231 successively contacts normally closed switches 237 and 239, no valves are actuated and fuel is brought into cylinder 227 through conduit 255. Heater 257, if present in conduit 255, is automatically actuated at this time. When rod 231 next contacts switch 241, valve 259 is closed, thereby terminating flow of fuel into cylinder 227, and transducer 253 is activated to impart ultrasonic energy to the fuel contained within cylinder 227. Continued movement of rod 231 causes is to contact final switch 243 which closes off valve 251 and negative pressure supply through line 249. At this point, valve 247 is opened to admit positive pressure from line 245 into cylinder 227 and valve 263 is opened to permit light vapor fractions to flow out of cylinder 227 and through conduit 261. Transducer 253 is also deactivated when contact is made on switch 243 by rod 231. When rod 231 has reached this maximum upstroke position, it then begins its downstroke movement by virtue of positive pressure being applied to piston 229 from line 245.

When rod 231 passes and closes normally opened switches 241 and 243, there is no valve actuation. However, when rod 231 passes and opens normally closed switch 239, valve 263 is closed for terminating flow of light vapor fractions through conduit 261. Simultaneously, valve 275 is opened to permit the heavier liquid fractions produced by motor 223 to flow through conduit 271 and out drain 63. In this position of rod 231, the reciprocating valve member in regulator valve 265 shifts to close off line 261, thereby permitting light vapor fractions from cylinder 277 to pass into conduit 97 from conduit 305 of motor 225.

It is therefore apparent that when rod 231 of motor 223 is moving towards its extended upstroke position rod 279 of motor 225 is moving towards its retracted down-stroke position. By virtue of switching valve 265, the symbiotic tandem and opposite operations of motors 223 and 225 are coordinated to permit a substantially continuous flow of light vapor fraction hydrocarbons through conduit 97, metering unit 269 and into carburetor 87.

As shown in FIG. 1, fuel system 1 of the present invention is depicted in conjunction with the internal combustion engine of a vehicle and, in this capacity serves to modify and utilize the fuel supply normally carried by the vehicle for its operation. Moreover, the embodiment of system 1 utilizes the separator 20 of FIG. 3, which employs heat from the exhaust manifold of the engine to effect fractionation of the fuel into lighter vapor and heavier liquid fractions. When separator 20 is utilized in system 1, either electronic fuel metering unit 31 may be incorporated in conduit 19 as shown in FIG. 1 or, alternatively, mechanical fuel metering unit 153 depicted in FIG. 5 may be utilized in place of valve 29 in conduit 19 as a substitute for unit 31. It is therefore apparent that when separator 20 is being utilized, either electronic unit 31 or its mechanical analog unit 153 is disposed upstream of separator 20 to meter unfractionated fuel received from container 3 through conduit 19.

However, when separator 221 depicted in FIG. 7 and utilizing ultrasonic energy is employed in system 1, metering units 31 or 153 may alternatively be utilized in conjunction therewith by disposing the desired unit in conduit 97 for unit 269 as previously indicated in the description of FIG. 7. In this situation, unit 31 or unit 153 is disposed downstream from separator 221 and serves to meter light vapor fraction hydrocarbons directly into carburetor 87. When separator 221 is utilized, nozzle 99 is not necessary since starting of the engine can be effected from light vapor fractions produced by separator 221.

MODE OF OPERATION

For the purpose of describing the basic mode of operation of a fuel system according to the present invention, reference shall now be made to fuel system 1 as it is depicted in FIG. 1. In starting the engine, current from a standard ignition activates thermostatic control unit 25 which senses the internal temperature of separator 20 through thermal sensors 53 and 55. Since the temperature is low, unit 25 opens solenoid valve 111, thereby permitting fuel from container 3 to be sent to fogging nozzle 99 through conduit 107. Seconary power supply 103 is activated and serves to operate the ultrasonic unit associated with nozzle 99 so that fuel may be sprayed as fine droplets into throat 91 of carburetor 87. This serves to start the engine whch in turn circulates its hot exhaust gases through separator 20 by way of conduits 45 and 47. When a predetermined critical temperature is reached in separator 20, control unit 25 opens valve 23 and fuel from container 3 is sent through conduit 19 to separator 20. The latter fractionates the fuel and sends light vapor fractions to venturi 95 of carburetor 87 to supplement fuel droplets produced by nozzle 99. Capacitor 117 then shuts off the operation of nozzle 99 by closing valve 111 and detaching power supply 103. The engine then continues to operate from light vapor fractions fed into carburetor 87 through conduit 97.

When operator demand increases and the throttle plate of the engine opens, electronic metering unit 31 sends increased current to variable solenoid valve 29 to increase flow of fuel therethrough to separator 20 which in turn provides carburetor 87 with a greater amount of light vapor fractions. Unit 31 provides supporting current to permit minimal fuel to be injected in carburetor 87, thereby permitting the engine ignition to occur at any speed. Unit 31 also provides supplementary current to permit additional fuel to be injected in the engine to allow momentary enrichment of the air-to-fuel mixture up to the maximum fuel for maximum power at any given engine speed, though always maintaining a lean fuel mixture or higher than stoichiometric air-to-fuel ratio. Unit 31 further provides the supplementary current at a rate proportional to the degree operator demand exceeds engine speed at any given time or speed; operator demand being imposed directly through accelerator actuation or throttle linkage actuation.

Separator 20 operates at a control temperature of preferably between about 325°–375° F. if gasoline is the fuel supply being utilized. The heavy oily hydrocarbon fractions in liquid form are drained from separator 20 through conduit 63 into second container 61 for storage. In the event that container 61 is filled to maximum capacity, float indicator 69 actuates switching unit 73 which in turn cuts off power supply 81 from system 1, thereby terminating the operation of system 1 in the same manner as switching off the ignition of the vehicle.

As a safety measure, in the event of misfire due to the high volatility of the light vapor fractions being carbureted into intake manifold 93, the back pressure of such misfire serves to contact impact members 124 disposed in throat 91 of carburetor 87. This pivots closure plate 121 upwardly against abutment 125 and immediately directs the misfire gases out vent 119, while simultaneously preventing additional passage of light vapor fractions into manifold 93.

It is anticipated that new and different forms of fuel, including synthetic fuels, may be utilized for operating internal combustion engines. Such fuels may be extremely explosive in nature and will require the inclusion of burning inhibitors in order to accommodate safe transportation to locations of use. The present invention encompasses the removal of such burning inhibitors at the engine to any degree required to render the explosive fuel available for operation of the engine.

It is to be understood that the embodiments of the invention herein shown and described are to be taken as preferred examples of the same, and that various changes in the shapes, sizes, arrangement of parts, compositions and methods of use and operation may be resorted to, without departing from the spirit of the invention or scope of the subjoined claims.

What is claimed is:

1. A method of utilizing a liquid hydrocarbon fuel such as gasoline or the like for efficiently operating an internal combustion engine and reducing the formation of polluting products of combustion, which method comprises the steps of:
    (a) providing a source of liquid hydrocarbon fuel which is capable of being combusted by an internal combustion engine and comprised of approximately two-thirds light fuel fraction and one-third heavy fuel fraction by volume;
    (b) separating the hydrocarbon fuel by vaporizing the light fuel fraction into a light vapor fraction substantially in the absence of air to prevent liquid phase oxidation of the hydrocarbon fuel and maintaining the light fuel fraction in vapor form;
    (c) carbureting substantially only the light vapor fraction into the internal combustion engine for operating same at a higher than stoichiometric air-to-fuel ratio that varies in response to engine speed and operator demand under all operating conditions; and
    (d) isolating substantially only the heavy fuel fraction from the source of hydrocarbon fuel.

2. A fuel system for efficiently utilizing a liquid hydrocarbon fuel such as gasoline or the like in the operation of an internal combustion engine wherein the fuel is comprised of approximately two-thirds light fuel fraction and one-third heavy fuel fraction by volume, which system comprises: p1 (a) a first container for storing the hydrocarbon fuel;
    (b) means for separating the fuel by vaporizing the light fuel fraction into a light vapor fraction substantially in the absence of air to prevent liquid phase oxidation of the hydrocarbon fuel and maintaining the light fuel fraction in vapor form;
    (c) a second container for storing the heavy fuel fraction;
    (d) a carburetor for injecting a fuel mixture comprising substantially only the light vapor fraction and air into the engine for operating same; and
    (e) means for regulating the flow of light vapor fraction to the carburetor wherein the air-to-fuel ratio is permitted to vary in accordance with engine speed and operator demand while maintaining a higher than stoichiometric air-to-fuel ratio under all operating conditions.

3. The method of claim 1 wherein:
(a) the source of hydrocarbon fuel is stored within a first container, and
(b) the heavy liquid fraction is isolated by storing same within a second container.

4. The method of claim 3 further including the step of subjecting the fuel contained within the first container to a pressure above atmospheric pressure.

5. The method of claim 1 wherein the source of hydrocarbon fuel comprises gasoline.

6. The method of claim 1 wherein the separating is achieved by heating the hydrocarbon fuel.

7. The method of claim 6 wherein the heating is conducted at a temperature range of between approximately 300°–400° F.

8. The method of claim 1 wherein the separating is achieved by applying ultrasonic energy to the hydrocarbon fuel.

9. The method of claim 8 further including the step of preheating the hydrocarbon fuel prior to the application of ultrasonic energy thereto.

10. The method of claim 1 further including the step of regulating the flow of light vapor fraction to the carburetor in accordance with engine speed and operator demand.

11. The system of claim 2 wherein the separator includes means for heating the hydrocarbon fuel.

12. The system of claim 11 wherein the heating means includes:
   (a) a casing for receiving hydrocarbon fuel from the first container;
   (b) a jacket surrounding the casing and defining an annular chamber therewith; and
   (c) means for circulating a fluid heating medium through the annular chamber.

13. The system of claim 12 wherein the heating medium comprises gaseous products of combustion derived from the operation of the engine.

14. The system of claim 12 wherein the circulating means includes:
   (a) an intake conduit for introducing the heating medium into the annular chamber;
   (b) an output conduit for removing the heating medium from the annular chamber;
   (c) a valve for controlling heating medium flow through the intake and output conduits;
   (d) means for sensing the temperature of the casing interior; and
   (e) thermostatic control means for actuating the valve in response to the sensing means when the temperature of the casing interior reaches a predetermined value.

15. The system of claim 1 wherein the separator includes means for applying ultrasonic energy to the hydrocarbon fuel.

16. The system of claim 15 further including means for preheating the hydrocarbon fuel.

17. The system of claim 15 wherein the ultrasonic energy applying means includes:
   (a) a first fluid-operated motor for receiving hydrocarbon fuel;
   (b) a first ultrasonic energy generating transducer carried by the first motor;
   (c) a second fluid-operated motor for receiving hydrocarbon fuel;
   (d) a second ultrasonic energy generating transducer carried by the second motor; and
   (e) means for supplying fluid pressure to the first and second motors to operate same in tandem with each other to produce a substantially continuous source of light vapor fraction.

18. The system of claim 17 wherein:
   (a) each motor includes a cylinder and a piston disposed within the cylinder for movement between an upstroke position and a downstroke position; and
   (b) the fluid pressure supply means includes:
      i. a source of positive pressure for moving the piston towards the downstroke position, and
      ii. a source of negative pressure for moving the piston towards its upstroke position.

19. The system of claim 18 further including means for controlling the flow of light vapor fraction produced by the tandem operation of the first and second motors to the regulating means.

20. The system of claim 19 wherein:
   (a) each piston includes an associated rod for extension from and retraction within the cylinder during the movement of the piston between the upstroke and downstroke positions; and
   (b) the means for controlling the flow of light vapor fraction includes:
      i. a first set of switch-operated valves for sequential actuation by the rod of the first motor, and
      ii. a second set of switch-operated valves for sequential actuation by the rod of the second motor.

21. The system of claim 2 wherein the regulating means includes:
   (a) an elongate casing having a bore disposed along the longitudinal axis thereof; and
   (b) a tubular valve member rotatably received within the bore and defining an annular chamber therewith, said valve member including spaced first and second slots formed in the wall thereof for providing communication between the interior of the valve member and the annular chamber; and
   (c) a rotatable plug disposed within the valve member for varying the degree of communication between the interior of the valve member and the annular chamber through the second slot.

22. The system of claim 21 further including:
   (a) means for rotating the valve member in direct proportion to engine speed; and
   (b) means for rotating the plug in direct proportion to operator demand.

23. The system of claim 21 further including:
   (a) an inlet for admitting fluid into the interior of the valve member; and
   (b) an outlet for removing fluid from the annular chamber.

24. The system of claim 21 wherein:
   (a) the first and second slots each extend for approximately 180° around the wall of the valve member;
   (b) the annular chamber has a substantially semicylindrical cross-sectional configuration; and
   (c) the degree of communication between the interior of the valve member and the annular chamber through the first and second slots may be simultaneously varied by rotating the valve member within the bore.

25. The system of claim 2 wherein the regulating means includes:
   (a) a variable capacity solenoid valve for varying the flow of light vapor fraction to the carburetor;
   (b) means for providing a first elelctrical signal in proportion to engine speed;
   (c) means for providing a second electrical signal in proportion to operator demand;
   (d) a first circuit for providing a first electrical output for operating the solenoid valve;
   (e) a first means for amplifying any difference between the first and second electrical signals;
   (f) a second circuit for providing a second electrical output in proportion to the amplified signal difference; and
   (g) a second means for summing and amplifying the first and second electrical outputs to produce a third electrical output in proportion thereto for operating the solenoid valve.

26. The system of claim 25 wherein the means for providing the first electrical signal includes a tachometer.

27. The system of claim 25 wherein the means for providing the second electrical signal includes a potentiometer.

28. The system of claim 2 wherein the carburetor includes:
(a) a throat;
(b) a valve disposed within the throat for closing off the passageway defined thereby in response to fluid back pressure produced by combustion of the fuel mixture.

29. The system of claim 28 wherein the valve includes:
(a) a pivotal plate;
(b) an abutment carried by the throat for limiting the pivotal movement of the plate; and
(c) means carried by the plate for contact by the fluid back pressure to pivot the plate and cause agitative mixing of the fuel mixture during operation of the engine.

30. The system of claim 28 wherein the throat further includes means for venting the fluid back pressure when the passageway is closed off by the valve.

31. The system of claim 2 wherein the carburetor includes an injection means for initiating the operation of the engine.

32. The system of claim 31 wherein the injection means includes:
(a) a nozzle for receiving hydrocarbon fuel from the first container and spraying same into the engine;
(b) means carried by the nozzle for applying ultrasonic energy to the fuel being sprayed; and
(c) means for controlling the flow of fuel to the nozzle.

33. The method of claim 1 further comprising the step of mixing air with the light vapor fractions subsequent to its separation from the hydrocarbon fuel and prior to carbureting same into the internal combustion engine.

34. The system of claim 2 wherein the separator further includes means for mixing the light vapor fraction with air subsequent to its separation from the hydrocarbon fuel.

* * * * *